Figure 1:
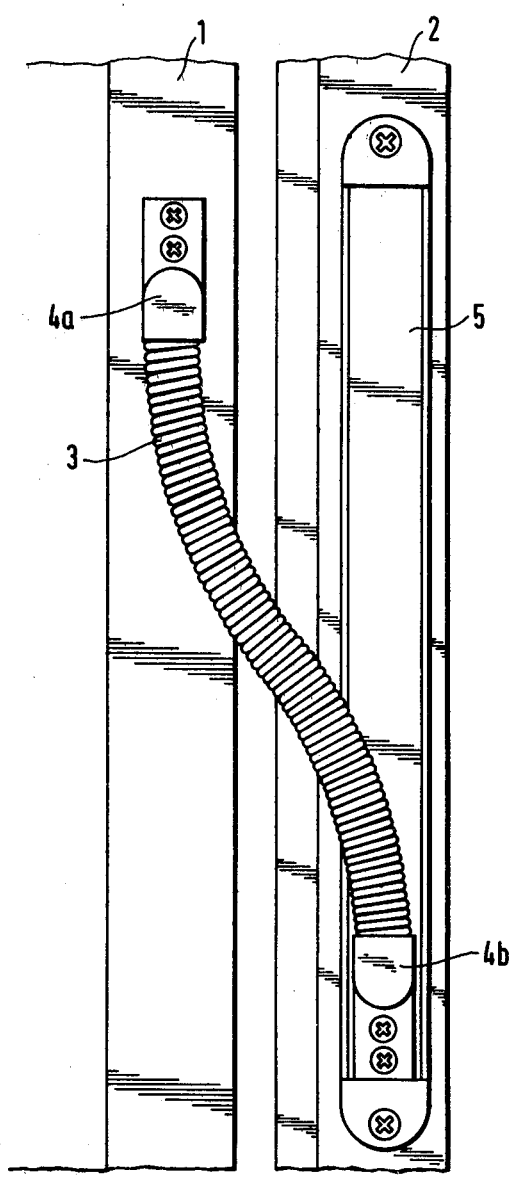

United States Patent [19]

Lehikoinen et al.

[11] 4,445,299

[45] May 1, 1984

[54] ARRANGEMENT IN DOORS

[75] Inventors: Keijo Lehikoinen; Kyösti Nevalainen, both of Joensuu, Finland

[73] Assignee: Oy Wartsila Ab, Helsinki, Finland

[21] Appl. No.: 236,122

[22] Filed: Feb. 19, 1981

[30] Foreign Application Priority Data

Feb. 20, 1980 [FI] Finland .................................. 800497

[51] Int. Cl.³ .......................... B60J 1/08; B60J 13/00
[52] U.S. Cl. ........................................ 49/167; 174/86; 339/4
[58] Field of Search ........................ 49/167, 381, 383; 174/86; 339/4

[56] References Cited

U.S. PATENT DOCUMENTS 2,685,657 8/1954 Frerer et al. ..................... 174/86 X
2,729,444 1/1956 Horton .............................. 49/167 X
3,848,361 11/1974 Foster et al. ......................... 49/167

Primary Examiner—Philip C. Kannan
Attorney, Agent, or Firm—McAulay, Fields, Fisher, Goldstein & Nissen

[57] ABSTRACT

The invention relates to an arrangement for obtaining an uninterrupted connection of an electric cable or the like between two elements pivotally hinged to each other, in particular, between a door frame element and a door connected thereto. The arrangement comprises, at the position of the connection, a member arranged around the cable in the form of a separate, turnable and longitudinally flexible protecting element. This element is arranged basically in the longitudinal direction of the door frame element and one end of the element is connected to the door frame element and the other end to an adjacent edge part of the door. There is, for said protecting element, in the door frame and/or in said door edge part, at least one recess. This recess is so arranged that, when the door is closed, the protecting element and said cable are received in this recess.

10 Claims, 4 Drawing Figures

ARRANGEMENT IN DOORS

The invention relates to an arrangement for obtaining an uninterrupted connection of an electric cable or the like between two elements pivotally hinged to each other, in particular, between a door frame element and a door connected thereto. In the following, the door will be used a symbol for any pivotally journalled closing element, a shut or the like.

The object of the invention is to obtain said connection in a way as uncomplicated as possible, so that the cable, in spite of repeated opening and closing of the door, will not be damaged in any way, and also so, that neither in the door nor in the door frame element, there are any visible signs of the cable, when the door is closed against the door frame. According to the invention these objects are obtained in the way presented in claim 1.

In a preferred embodiment of the invention, the protecting element of the cable comprises a flexible tension spring. The spring will be somewhat turned and elongated when the door is opened, but nevertheless, it will all the time protect the cable of cables enclosed therein.

A recess is made in the door and/or in the door frame element for said protecting element. This recess may be provided with a separate trough element, which works as an effective protection against any possible wearing influence from the tension spring and in which one end of the tension spring can be attached. The trough element should preferably be so dimensioned, that it substantially corresponds to the length of said protecting element, when this is in its normal position, that is, is not expanded.

In another preferred embodiment of the invention, the protecting element comprises two members arranged in a telescopic manner relative to each other and having their free ends swingably and turnably connected to said door frame element and to said door. Said recess then comprises two separate trough elements, of which one is installed in the door frame element and the other in the adjacent edge portion of the door. These trough elements are so arranged relative to each other, that when the door is closed, one of the telescoping members is received by the one trough element and the other is correspondingly received by the other trough element.

Figure 2:
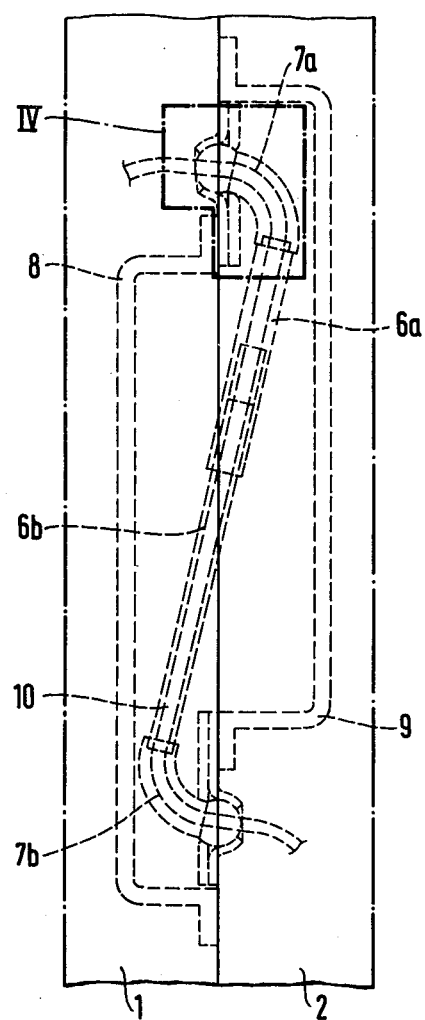
Figure 3:
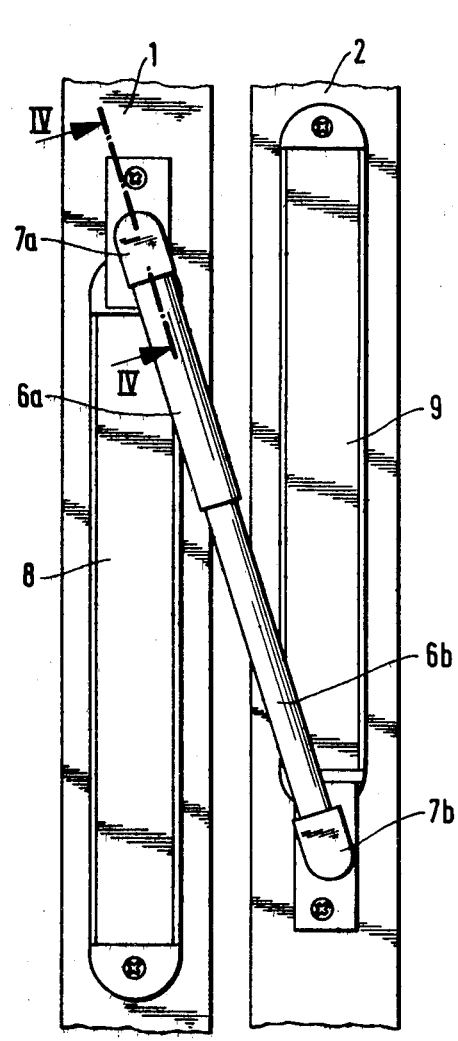
Figure 4:
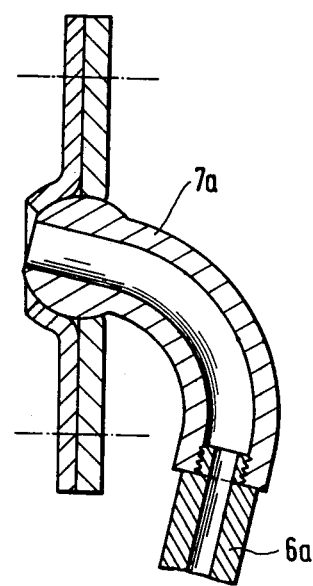

In the following, the invention will be described more in detail with reference to the attached drawing, in which FIG. 1 shows an embodiment of the invention, when the door is open, FIG. 2 shows another embodiment of the invention, when the door is closed, FIG. 3 shows the embodiment of FIG. 2, when the door is open, and FIG. 4 shows portion IV of FIG. 2 on an enlarged scale.

In the drawing, reference numeral 1 indicates the door frame element and reference numeral 2 the door. In the embodiment shown in FIG. 1, there is, between door frame element 1 and door 2, a helical tension spring 3 acting as a protecting element, inside which electric cables or the like can be placed to run from the door frame element to the door. One end of tension spring 3 is by means of an end element 4a attached to the door frame element and the other end in a corresponding manner attached to the door by means of an end element 4b. As shown in FIG. 1, spring 3 is somewhat expanded and bent when the door is opened. When the door is closed, helical spring 3 is received by a protecting trough element 5. Trough element 5 can be installed in the door frame element 1 as well as in the door 2.

In the embodiment shown in FIGS. 2 and 3, the protecting element includes two in a telescopic manner arranged members 6a and 6b. Telescoping member 6a is by means of an end element 7a attached to the door frame element 1 and telescoping member 6b is in a corresponding manner, by means of an end element 7b, attached to the door 2. As shown in FIG. 2, telescoping member 6a and its end element 7a is received by a trough element 9 in the door, when the door is in closed position. Correspondingly, telescoping member 6b and end element 7b have a trough element 8 in door frame element 1.

As shown in FIG. 3, telescoping members 6a and 6b have moved, when the door is in open position, axially outwardly relative to each other and have simultaneously been somewhat turned relative to each other. The end elements 7a and 7b in turn have been swung and turned relative to their base. For allowing this, the end elements can be journalled on their base, for instance, by means of a ball joint, but other joint mechanisms allowing said movements can be used as well.

In both of the embodiments shown, the protecting element can protect one or several cables 10. The cable or the cables can be installed at the same time as the protecting element, but the cables can also be introduced afterwards through the protecting element already installed, which, however, may cause some practical problems. Because the protecting element is somewhat expanded when the door is opened, the cables should have a corresponding excess length.

The invention is not limited to the embodiments shown, but several modifications thereof are feasible within the scope of the attached claims.

We claim:

1. An arrangement for obtaining an uninterrupted connection of an electric cable or the like between two elements pivotally hinged to each other, in particular, between a door frame element and a door connected thereto, said arrangement comprising:

at the position of the connection, a single hollow member arranged to enclose said cable in the form of a separate, turnable and longitudinally flexible protecting element, said element being arranged basically in the longitudinal direction of said door frame element;

a first connection element for connecting one end of said hollow member to said door frame element;

a second connection element for connecting the other end of said hollow member to an adjacent edge part of said door;

at least one recess in said door frame element and/or in said door edge part for said single hollow member, said first connection element and said second connection element, said at least one recess being so arranged that, when said door is closed, said protecting element and said cable are received in said recess; and said first and second connection elements each including:

a ball joint element having an enclosed passageway for the cable forming a continuous passageway with said single hollow member; and said ball joint elements permitting said single hollow member to be swung and turned relative to said first and said second connection elements.

2. The arrangement according to claim 1, in which said protecting element comprises
   a single flexible tension spring;
   one end of said tension spring being connected with said first connection element and the other end of said tension spring being connected with said second connection element;
   said spring being somewhat turned and elongated when the door is opened and adjacent turns of said spring being close together when said spring is untensioned.

3. An arrangement according to claim 2, in which said recess includes a separate trough-shaped element, wherein one end of said protecting element is attached.

4. An arrangement according to claim 3, in which said trough-shaped element is so dimensioned, that it substantially corresponds to the length of said protecting element, when this is in its normal, not-expanded position.

5. An arrangement according to claim 2, in which said protecting element comprises telescoping members, the free ends of said members being turnably and swingably attached to said door frame element and to said door, respectively.

6. An arrangement according to claim 5, in which said recess includes two separate trough-shaped elements, of which one is located in said door frame element and the other in an adjacent edge part of said door, said trough-shaped elements being so located relative to each other, that, in the closed position of said door, one of said telescoping members is located substantially in one of said trough-shaped elements and the other correspondingly in the other of said trough-shaped elements.

7. An arrangement for obtaining an uninterrupted connection of an electric cable or the like between two elements pivotally hinged to each other, in particular, between a door frame element and a door connected thereto, said arrangement comprising:
   at the position of the connection, a single hollow member arranged to enclose said cable in the form of a separate, turnable and longitudinally flexible protecting element, said element being arranged basically in the longitudinal direction of said door frame element;
   a first connection element for connecting one end of said hollow member to said door frame element;
   a second connection element for connecting the other end of said hollow member to an adjacent edge part of said door;
   at least one recess in said door frame element and/or in said door edge part for said single hollow member, said first connection element and said second connection element, said at least one recess being arranged that, when said door is closed, said protecting element and said cable are received in said recess; and
   said first and second connection elements and said single hollow member providing a full enclosure for said cable.

8. An arrangement according to claim 7, wherein said first and second connection hollow door frame elements each includes:
   a ball joint element having an enclosed passageway for the cable forming a continuous passageway with said single hollow member;
   said ball joint elements permitting said single hollow member to be swung and turned relative to said first and second connection elements.

9. The arrangement according to claim 7, in which said protecting element comprises:
   a single flexible tension spring;
   one end of said tension spring being connected with said first connection element and the other end of said tension spring being connected with said second connection element;
   said spring being somewhat turned and elongated when the door is opened and adjacent turns of said spring being close together when said spring is untensioned.

10. The arrangement according to claim 1 or 2 or 7, wherein said protecting element is a sole enclosure and protector for said electric cable between said first and said second connection elements.

* * * * *